United States Patent [19]
Breitschwerdt et al.

[11] 3,743,229
[45] July 3, 1973

[54] ADJUSTING ARRANGEMENT FOR A SEAT

[75] Inventors: Werner Breitschwerdt, Stuttgart; Günter Gmeiner, Sindelfingen; Christian Grabner, Maichingen, all of Germany

[73] Assignee: Daimler-Benz Aktiengesellshaft, Stuttgart-Unterturkheim, Germany

[22] Filed: June 22, 1971

[21] Appl. No.: 155,489

[30] Foreign Application Priority Data
June 23, 1970 Germany.................. P 20 30 807.0

[52] U.S. Cl.................. 248/394, 248/429, 297/328
[51] Int. Cl............................................ F16m 11/24
[58] Field of Search................... 248/393, 394, 395, 248/396, 397, 157, 419, 420, 423, 429, 430; 297/338, 319, 327, 328; 308/62

[56] References Cited
UNITED STATES PATENTS

| 2,134,135 | 10/1938 | Lefevre | 248/396 |
| 2,712,346 | 7/1955 | Sprinkle | 297/319 |
| 3,189,312 | 6/1965 | Bilancia | 248/394 |
| 3,382,013 | 5/1968 | Toth et al. | 308/62 |
| 3,467,450 | 9/1969 | Schmidt et al. | 308/62 |

FOREIGN PATENTS OR APPLICATIONS

| 106,799 | 3/1939 | Australia | 297/328 |
| 3,008 | 2/1901 | Great Britain | 248/429 |
| 892,762 | 3/1962 | Great Britain | 297/338 |
| 1,199,756 | 7/1970 | Great Britain | 297/338 |
| 649,595 | 11/1962 | Italy | 248/396 |

*Primary Examiner*—Marion Parsons, Jr.
*Attorney*—Craig, Antonelli & Hill

[57] ABSTRACT

An installation for the adjustment of a seat, especially of a motor vehicle front seat, which is equipped with a seat frame displaceable in the vehicle longitudinal direction within guide rails that are adapted to be secured at a lateral plate whereby the guide rails are so secured, preferably at one or both ends, as to be adjustable in height.

36 Claims, 4 Drawing Figures

Patented July 3, 1973 3,743,229

INVENTORS
WERNER BREITSCHWERDT
GÜNTER GMEINER
CHRISTIAN GRABNER

BY Craig, Antonelli & Hill

ATTORNEYS

Patented July 3, 1973 3,743,229

INVENTORS
WERNER BREITSCHWERDT
GÜNTER GMEINER
CHRISTIAN GRABNER

BY
Craig, Antonelli & Hill
ATTORNEYS

ADJUSTING ARRANGEMENT FOR A SEAT

The present invention relates to an installation for the adjustment of a seat, especially of a motor vehicle front seat, which includes a seat frame displaceable in the vehicle longitudinal direction in guide rails that are secured at a lateral sheet metal element or plate.

Installations for the adjustment of a seat are known in numerous types of constructions. They allow, in general, an adjustment of the seat in such a manner that the entire seat can be displaced in the vehicle longitudinal direction. For the most part, additionally the inclination of the backrest to the seat cushion is adjustable.

For purposes of increasing the driving comfort and for purposes of avoiding fatigue of the driver, it is desirable that additionally the seat surface of the seat cushion is adjustable in height and/or in its inclination so that each driver can adapt his seat position to his own requirements.

The present invention is therefore concerned with the task to so construct an installation of the aforementioned type that it permits an adjustment of the inclination and/or of the height of the seat cushion. This installation is to be realized with simple structural means, whereby due consideration must be additionally given that high transverse forces have to be absorbed especially in vehicles. The present invention essentially consists in that the guide rails are secured preferably at one or both ends so as to be adjustable in height. With this type of construction, it is not necessary that the seat frame is adjusted. If the guide rails are secured so as to be adjustable in height at only one end, then only the inclination of the seat surface can be adjusted whereas with a mounting adjustable in height at both ends, additionally the height of the seat surface can be adjusted.

An advantageous embodiment of the present invention is obtained if each guide rail is supported at least at one end on the circumference of a rotatable disk which is secured at a lateral metal plate or the like by means of an eccentrically arranged bolt. This embodiment is structurally very simple whereas simultaneously high transverse forces can be absorbed. It is advantageous for the absorption of high transverse forces if the disks are arranged on the inside of the guide rails constructed in a conventional manner as C-shaped profiles.

In order to increase the possible adjusting range, it is appropriate if the profile of the guide rails is radially enlarged with respect to the disks within the area of the disks. In order to assure a safe mounting of the guide rails in the vehicle longitudinal direction, it is appropriate if the guide rails are provided with vertical slots for the accommodation of the bolts.

A structurally very simple embodiment is obtained if the bolts are provided with a threaded portion screwed into the metal side plate or the like. With this type of construction, the eccentrically arranged bolt simultaneously assumes the mounting and fastening of the guide rails.

If the guide rails are exposed to particularly high loads, for example, if the safety belts are pivotally secured thereat, according to a further feature and development of the present invention, the guide rails are secured additionally preferably approximately in the center thereof at the lateral plate or sheet metal element by means of a joint which is movable in the vertical direction and stiff in the horizontal direction.

In order to be able to carry out the adjustment in a simple manner, each disk is provided with a control handle which is adapted to be tilted preferably by a spring into a plane parallel to the disk. Provision is thereby made in an advantageous embodiment of the present invention that the control handle in its folded-in position stops or locks the disk against rotation. It is assured thereby that an unintentional adjustment of the inclination or of the height of the seat surface is precluded.

In one embodiment of the present invention, the control handle is provided with a detent bolt engaging in the folded-in position into corresponding notches provided in the guide rails. A step-wise locking is possible with this embodiment which depends from the arrangement of the detent pins or the engaging points at the guide rails.

In another embodiment of the present invention, the control handle is provided within the area of its bearing support with an at least approximately perpendicularly projecting part, which in the folded-in position wedges the guide rails between itself and the disk. It is thereby appropriate if the control handle is arranged eccentrically to the disk. In order to be able to provide the locking action by the wedging connection over the entire adjusting range of the disk, according to a further feature of the present invention, a plate securely connected with the guide rail is provided within the movement path of the control handle. With this embodiment, the height and/or the inclination of the seat surface of the seat cushion is adjustable and lockable in a stepless manner.

Accordingly, it is an object of the present invention to provide a seat adjustment installation for the seats of motor vehicles which avoids by simple means the aforementioned shortcomings and drawbacks encountered in the prior art.

Another object of the present invention resides in an installation for the adjustment of the inclination and/or the height of the seat cushion which is simple in construction, easy to operate, and relatively inexpensive.

A further object of the present invention resides in a seat-adjusting installation for adjusting the height and/or inclination of the seat which is capable of absorbing high transverse forces.

Still another object of the present invention resides in a seat-adjusting installation of the type described above which precludes by simple means the inadvertent adjustment of the inclination and/or height of the seat surface.

These and further objects, features, and advantages of the present invention will become more apparent from the following description when taken in connection with the accompanying drawing which shows, for purposes of illustration only, two embodiments in accordance with the present invention, and wherein.

Figure 1:
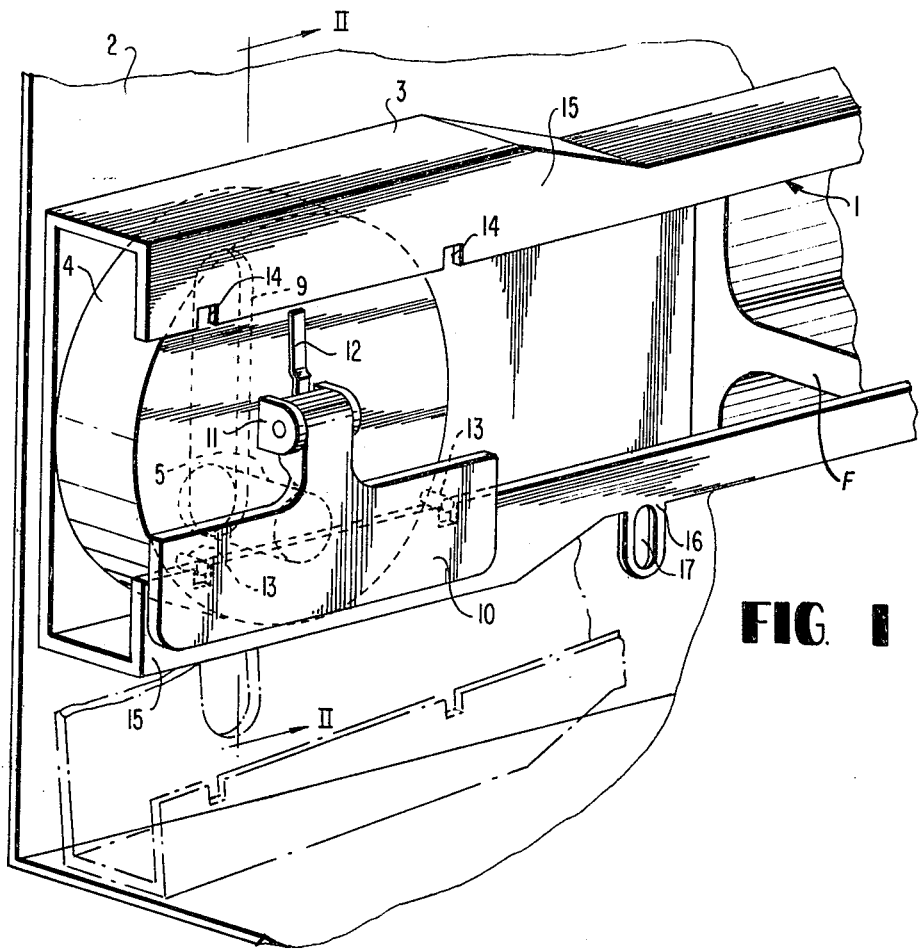
FIG. 1 is a partial perspective view of a seat-adjusting installation in accordance with the present invention.

Referring now to the drawing wherein like reference numerals are used throughout the various views to designate like parts, and more particularly to FIG. 1, the fastening and mounting of a guide rail generally designated by reference numeral 1 at a lateral sheet metal element or plate 2 is illustrated in this figure. Such types of guide rails 1, which have a C-shaped profile, are arranged on both sides of a longitudinally displaceable seat (not shown). The frame of the seat F is guided within the guide rails 1, which engages with slide members in the profile of the guide rails 1. Its respective position is secured by appropriate stop means in a conventional manner, not illustrated in detail herein. In order to achieve a height adjustment or an adjustment of the inclination of the seat surface, the guide rails 1 are secured at the lateral plate or sheet metal element 2 to be adjustable in height so that for the adjustment of the seating surface, the entire seat can be lifted. If an installation for the adjustment is provided only at one end of a guide rail 1, then only the inclination of the seating surface is adjustable. If such installations are provided at both ends, then in addition to the inclination, also the height of the seat surface can be adjusted.

The ends 3 of the guide rails 1 consisting of C-shaped profiles are supported each on the circumference of a circular disk 4 which is fitted into the end 3 of the guide rails 1, enlarged in its height. The disk 4 is secured at the lateral plate 2 by means of an eccentrically arranged bolt 5. As can be seen from FIG. 2, the bolt 5 is appropriately constructed as countersunk screw which is screwed into a reinforcement 7 of the lateral plate or sheet metal element 2 by means of a threaded portion 6 and rests with its head 8 at the disk 4. The bolt 5 is guided in the guide rail 1 within a vertical slot constructed as elongated aperture 9. The disk 4 can be rotated within the end 3 of the guide rail 1 about the eccentrically arranged bolt 5 whereby the guide rail 1 can be lifted or lowered. The bolt 5 thereby moves within the slot 9.

Figure 2:
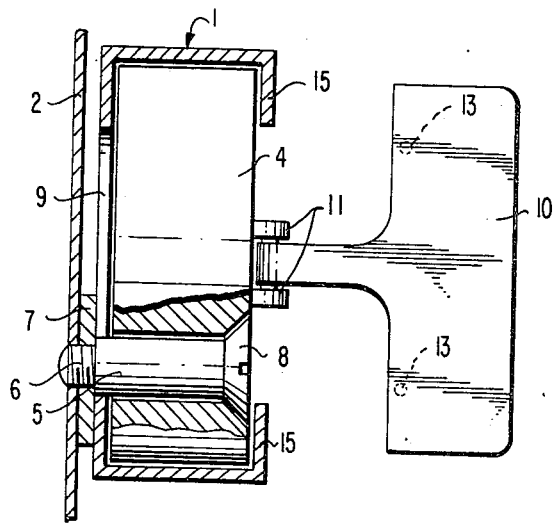
FIG. 2 is a cross-sectional view taken along line II—II of FIG. 1.

The rotation of the disk 4 takes place by means of a handle 10 which is held in a bearing lug 11 secured coaxially at the disk 4. A spring 12 is arranged in the bearing lug 11 which so stresses the handle 10 that it is always forced or drawn automatically into its folded-in position, in which it is disposed with its flat side parallel to the end face of the disk 4. In the folded-together position, illustrated in FIG. 1, the handle 10 engages with detent bolts 13 in apertures 14 of the guide rails 1 and thereby locks the disk 4. With the selected arrangement of the detent bolts 13 and of the apertures 14 as shown in FIGS. 1 and 2, the disk 4 can be locked at least in three positions by folding-over the handle 10. The handle 10 may engage with its detent bolts 13 into the lower apertures 14 in the manner illustrated in FIG. 1 or after a rotation may engage into the upper apertures 14. Also in the position illustrated in FIG. 2, the handle 10 is adapted to be locked since upon folding-over the detent bolts 13 are disposed between the inwardly bent leg portions 15 of the end of the guide rail 1 and thus preclude a rotation of the handle 10 and therewith of the disk 4. By the selection of the number of detent bolts 13 and the apertures 14 also a more fine detent mechanism can be obtained so that the handle 10 and therewith the disk 4 can also be locked in further intermediate positions.

Transverse forces which are already as such relatively high, can be transmitted by this special mounting of the guide rails 1. However, if very high loads of the guide rails 1 occur, for example, by the pivotal connection of a safety belt, then the guide rails 1 can be additionally secured. For that purpose, a lug 16 is provided at the bottom of the guide rail 1 in the embodiment according to FIG. 1 which is provided with an elongated aperture 17. With the use of this lug 16, the guide rail 1 is secured at the lateral plate 2, for example, by means of a collar screw so that this joint permits a movement in the vertical direction but offers a resistance to transverse forces. In case the space available underneath the guide rail 1 is not sufficient for the accommodation of a lug 16 with an elongated aperture 17, the lug 16 can be kept very short and can be connected by way of a connecting bracket with the lateral plate or sheet metal element 2. The connecting bracket which is disposed approximately horizontally at the lowest position of the guide rail 1 then receives the necessary elongated aperture.

Figure 3:
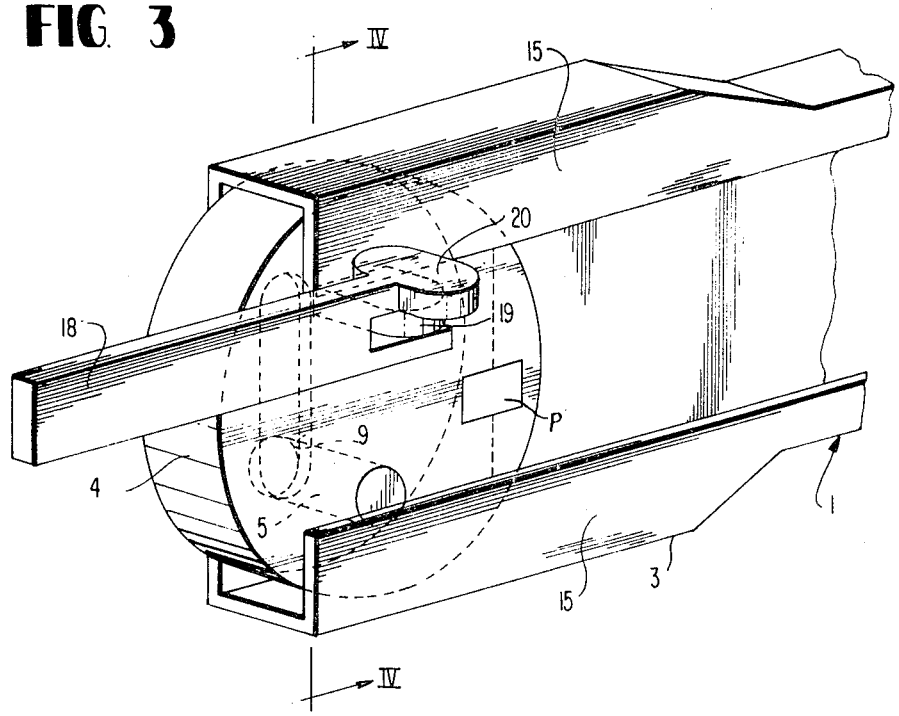
FIG. 3 is a perspective view of a modified embodiment of a seat-adjusting installation in accordance with the present invention.
Figure 4:
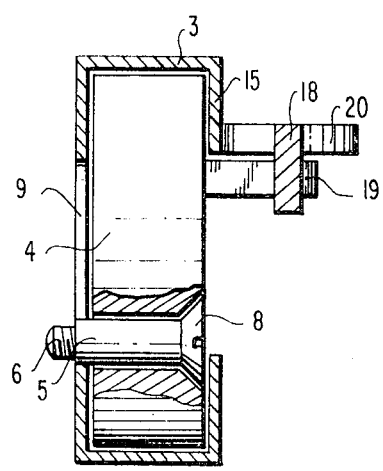
FIG. 4 is a partial cross-sectional view, taken along line IV—IV of FIG. 3.

The embodiment according to FIG. 3 corresponds essentially to the embodiment of FIG. 1. Also in the embodiment of FIG. 3, a guide rail 1 is provided, in the enlarged end 3 of which is arranged a circular disk 4 which is adapted to be secured at a lateral plate or sheet metal element (not shown) by way of an eccentric bolt 5. The bolt 5 is also guided in this embodiment in a vertical elongated aperture 9 of the guide rail 1. If the disk 4 is rotated about the bolt 5, then the guide rail 1 is lifted or lowered whereas the bolt 5 slides within the elongated aperture 9. A handle 18 is provided in this embodiment for the rotation of the disk 4 which is eccentrically secured at a bearing lug 19 of the disk 4. The handle 18 is adapted to be pivoted from the illustrated position, in which its surface is disposed parallel to the end face of the disk 4, into a position disposed perpendicular thereto. The handle 18 includes within the area of the bearing lug 19 a portion 20 projecting at right angle toward both sides. With the aid of this portion 20, one of the inwardly angularly bent leg portions 15 of the end of the guide rail 1 is wedged between the part 20 and the disk 4 in the folded-in position which is illustrated in FIGS. 3 and 4, so that a locking is achieved thereby which simultaneously secures the installation against rattle noises. In order to achieve that the installation can be locked not only in the upper and in the lower position in which the portion 20 is disposed within the area of the leg portions 15, a plate or the like may be secured at the guide rail 1 in a manner not illustrated in detail, but schematically shown at P in FIG. 3, between the leg portions 15 of the guide rail 1 within the path of movement of the portion 20 to the bolt 5, which is then wedged in a corresponding manner by the handle 18 between its portion 20 and the disk 4. This construction then offers the advantage that the adjustment of the inclination and/or of the height of the seat surface can be undertaken continuously and the installation can be stopped in every position.

It is also possible to arrange an installation in accordance with the present invention at another place of the guide rail 1, for example, in the center thereof, whereby care must be taken, however, that the handle 10 or 18 is accessible and that the displacement movement of the seat frame is not impaired.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An installation for the adjustment of a seat, especially of a motor vehicle seat, which includes a seat frame displaceable generally in the vehicle longitudinal direction within guide rail means, and in which the guide rail means are adapted to be secured at a fixed lateral part, characterized by means operatively connected with said guide rail means for adjusting the latter in height, characterized in that each guide rail means is supported at least at one end thereof on the circumference of a rotatable disk means which is adapted to be secured at the lateral fixed part by an eccentrically arranged bolt means, and in that the disk means are arranged on the inside of the guide rail means constructed of substantially C-shaped profile.

2. An installation according to claim 1, characterized in that the profile of the guide rail means is enlarged within the area of the disk means radially to the latter.

3. An installation according to claim 2, characterized in that the guide rail means are provided with vertical slot means for the accommodation of the bolt means.

4. An installation according to claim 3, characterized in that each bolt means includes a threaded portion adapted to be screwed into the lateral fixed part.

5. An installation according to claim 4, characterized by joint means movable in a substantially vertical direction and relatively rigid in the horizontal direction for additionally securing the guide rail means at the lateral fixed part.

6. An installation according to claim 5, characterized in that said joint means is arranged approximately in the center of a respective guide rail means.

7. An installation according to claim 6, characterized in that each disk means is provided with a handle means adapted to be pivoted into a plane parallel to the disk means.

8. An installation according to claim 7, characterized in that said handle means is adapted to be pivoted into said plane by a spring.

9. An installation according to claim 8, characterized in that the handle means locks the disk means against rotation in its pivoted-in position.

10. An installation according to claim 9, characterized in that the handle means is provided with detent bolt means engaging in the guide rail means in the pivoted-in position.

11. An installation according to claim 10, characterized in that the guide rail means are adjustable in height at one end thereof.

12. An installation according to claim 10, characterized in that said guide rail means are adjustable in height at both ends thereof.

13. An installation according to claim 9, characterized in that the handle means within the area of its bearing means is provided with an at least approximately perpendicularly projecting part which wedges the guide rail means between itself and the disk means in the pivoted-in position.

14. An installation according to claim 13, characterized in that the handle means is arranged eccentrically to the disk means.

15. An installation according to claim 14, characterized in that a bracket means rigidly connected with the guide rail means is provided within the movement path of the handle means.

16. An installation according to claim 15, characterized in that the guide rail means are adjustable in height at one end thereof.

17. An installation according to claim 15, characterized in that said guide rail means are adjustable in height at both ends thereof.

18. An installation for the adjustment of a seat, especially of a motor vehicle seat, which includes a seat frame displaceable generally in the vehicle longitudinal direction within guide rail means, and in which the guide rail means are adapted to be secured at a fixed lateral part, characterized by means operatively connected with said guide rail means for adjusting the latter in height, characterized in that each guide rail means is supported at least at one end thereof on the circumference of a rotatable disk means which is adapted to be secured at the lateral fixed part by an eccentrically arranged bolt means, and in that the profile of the guide rail means is enlarged within the area of the disk means radially to the latter.

19. An installation for the adjustment of a seat, especially of a motor vehicle seat, which includes a seat frame displaceable generally in the vehicle longitudinal direction within guide rail means, and in which the guide rail means are adapted to be secured at a fixed lateral part, characterized by means operatively connected with said guide rail means for adjusting the latter in height, characterized in that each guide rail means is supported at least at one end thereof on the circumference of a rotatable disk means which is adapted to be secured at the lateral fixed part by an eccentrically arranged bolt means, and in that the guide rail means are provided with vertical slot means for the accommodation of the bolt means.

20. An installation for the adjustment of a seat, especially for use with a motor vehicle seat; said installation comprising:
guide rail means for guiding movement of a seat frame in the vehicle longitudinal direction,
rotatable disk means arranged on the inside of at least one end of said guide rail means with a circumferential portion of said disk means in engagement with said guide rail means,
and eccentrically arranged bolt means for rotatably attaching said disk means at a fixed vehicle part such that rotation of said disk means vertically adjusts said at least one end of said guide rail means with respect to said vehicle part.

21. An installation according to claim 20, wherein said guide rail means includes an upwardly facing portion and a downwardly facing portion rigidly interconnected with one another, said disk means being positioned between said upwardly and downwardly facing portions such that transverse forces experienced by said seat are transferred to said vehicle fixed part by way of said upwardly and downwardly facing portions of said guide rail means and said bolt means.

22. An installation according to claim 20, wherein said guide rail means is constructed of substantially C-shaped profile cross-section.

23. An installation according to claim 20, wherein the inside profile of the guide rail means is enlarged in the radial direction of the disk means within the area of the disk means for accommodating said disk means.

24. An installation according to claim 20, wherein said guide rail means are provided with vertical slot means for accommodating said bolt means.

25. An installation according to claim 21, wherein said guide rail means are provided with vertical slot means arranged intermediate said upwardly and downwardly facing portions for accommodating through passage of said bolt means.

26. An installation according to claim 20, wherein said disk means is provided with a handle means for applying rotative force to said disk means, said handle means being pivotally mounted at said disk means for movement between an operative position at an angle to the plane of said disk means and a storage position parallel to the plane of said disk means.

27. An installation according to claim 26, wherein said handle means and said guide rail means include interengageable parts for locking said disk means in predetermined rotative positions with respect to said guide rail means.

28. An installation according to claim 27, wherein said interengageable parts include pins on said handle means and slots in said guide rail means.

29. An installation according to claim 27, wherein said guide rail means is of C-shaped profile cross-section, and wherein said interengageable parts include protrusions on said handle means and respective upwardly and downwardly facing flanges on said guide rail means.

30. An installation according to claim 27, wherein said interengageable parts include an approximately perpendicular projecting part on said handle means within the area of bearing means for said handle means and a part of said guide rail means, said handle being mounted at an off-center position on said disk means.

31. An installation according to claim 30, wherein said last-mentioned part is a bracket means rigidly connected with the guide rail means within the movement path of the handle means.

32. An installation according to claim 26, further comprising spring means biasing said handle means towards said storage position.

33. An installation according to claim 27, further comprising spring means biasing said handle means towards said storage position.

34. An installation according to claim 30, wherein said guide rail means is of substantially C-shaped profile cross-section, and wherein said last-mentioned part of said guide rail means is at least one of the upwardly and downwardly directed portions of said guide rail means.

35. An installation according to claim 20, characterized by joint means movable in a substantially vertical direction and relatively rigid in the horizontal direction for additionally securing the guide rail means at the lateral fixed part.

36. An installation according to claim 34, characterized in that said joint means is arranged approximately in the center of a respective guide rail means.

* * * * *